(12) United States Patent
Ku et al.

(10) Patent No.: US 12,317,305 B2
(45) Date of Patent: May 27, 2025

(54) SYSTEMS AND METHODS FOR AVOIDING INTERFERENCE BETWEEN WIRELESS DEVICES IN A WIRELESS NETWORK

(71) Applicant: MediaTek Singapore Pte. Ltd., Singapore (SG)

(72) Inventors: Chung-Ta Ku, San Jose, CA (US); Weisung Tsao, San Jose, CA (US); Po-Yuen Cheng, San Jose, CA (US); Samet Shabdanov, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 359 days.

(21) Appl. No.: 17/672,417

(22) Filed: Feb. 15, 2022

(65) Prior Publication Data

US 2022/0264592 A1     Aug. 18, 2022

Related U.S. Application Data

(60) Provisional application No. 63/150,609, filed on Feb. 18, 2021.

(51) Int. Cl.
| | |
|---|---|
| *H04W 72/00* | (2023.01) |
| *H04B 1/04* | (2006.01) |
| *H04W 72/121* | (2023.01) |
| *H04W 72/541* | (2023.01) |
| *H04W 72/542* | (2023.01) |
| *H04B 17/318* | (2015.01) |
| *H04W 84/12* | (2009.01) |

(52) U.S. Cl.
CPC ........ *H04W 72/542* (2023.01); *H04B 1/0475* (2013.01); *H04W 72/121* (2013.01); *H04W 72/541* (2023.01); *H04B 17/318* (2015.01); *H04W 84/12* (2013.01)

(58) Field of Classification Search
CPC ............. H04W 72/542; H04W 72/121; H04W 72/541; H04W 84/12; H04W 28/18; H04W 72/04; H04B 1/0475; H04B 17/318
See application file for complete search history.

(56) References Cited

U.S. PATENT DOCUMENTS

| | | | | |
|---|---|---|---|---|
| 2010/0054145 | A1* | 3/2010 | Frenger | H04W 72/542 370/252 |
| 2012/0057471 | A1 | 3/2012 | Amini et al. | |
| 2016/0234831 | A1* | 8/2016 | Tian | H04W 72/121 |
| 2017/0019923 | A1 | 1/2017 | Agardh | |
| 2017/0288838 | A1* | 10/2017 | Cariou | H04L 5/0057 |

(Continued)

FOREIGN PATENT DOCUMENTS

| | | |
|---|---|---|
| CN | 102740354 A | 10/2012 |
| CN | 102948091 A | 2/2013 |

(Continued)

*Primary Examiner* — Lakeram Jangbahadur

(57) ABSTRACT

Embodiments of the present invention substantially mitigate or prevent in-device and inter-device interference (e.g., AACI) by grouping wireless stations associated with an AP according to their estimated physical proximity with each other. The transmissions to/from STAs within a group can be coordinated so that a wireless transmission does not interfere with the wireless reception of another STA within the same group. In this way, desense is avoided and the wireless reception can be performed efficiently.

16 Claims, 12 Drawing Sheets

(56) References Cited

U.S. PATENT DOCUMENTS

2018/0083793 A1   3/2018  Kim et al.
2019/0045522 A1*  2/2019  Doostnejad ......... H04W 72/542
2020/0154443 A1*  5/2020  Patil ..................... H04W 72/30

FOREIGN PATENT DOCUMENTS

| CN | 104813189 A | 7/2015 |
|----|-------------|--------|
| CN | 105264998 A | 1/2016 |
| CN | 106817202 A | 6/2017 |
| CN | 110290531 A | 9/2019 |
| CN | 110945936 A | 3/2020 |
| GB | 201300071D0 | 2/2013 |
| WO | 2015006756 A1 | 1/2015 |
| WO | 2018116650 A1 | 6/2018 |

* cited by examiner

SYSTEMS AND METHODS FOR AVOIDING INTERFERENCE BETWEEN WIRELESS DEVICES IN A WIRELESS NETWORK

CROSS-REFERENCE TO RELATED APPLICATIONS

This application claims the benefit of and priority to provisional patent application Ser. No. 63/150,609, with filing date Feb. 18, 2021, by Chung-Ta Ku, et al., which is hereby incorporated by reference in its entirety.

FIELD

Embodiments of the present invention generally relate to the field of wireless communications. More specifically, embodiments of the present invention relate to systems and methods for mitigating signal interference between devices in close physical proximity in a wireless communication network.

BACKGROUND

Many modern electronic devices send and receive data with other electronic devices wirelessly using Wi-Fi, and several devices may be communicating over bands or channels that are close in frequency within the same physical location, such as a home, office, or library. Often these devices, including smartphones, tablets, and laptop computers, are connected to the same wireless access point (AP). When two nearby devices associated with same AP are operated on bands that are close in frequency, the transmitting wireless station (STA) can interfere with another STA that is receiving data. The signal interference (e.g., alternative adjacent channel interference (AACI)) may decrease the RX sensitivity of the receiving device. This negative impact on sensitivity is referred to as "desense" and typically occurs when two operating bands are close in frequency and have inadequate isolation and filtering to prevent energy leakage from sidebands.

The unwanted desense can be caused by different wireless devices that are operating close to each other (inter-device desense) or different wireless stations (STAs) of the same multi-band device (in-device desense). The defense problem is magnified when the STAs are close in physical proximity to each other but far away from the AP. In general, a higher ISR (=I/S) causes more significant desense.

SUMMARY

What is needed is a communication approach to wireless transmission that coordinates transmissions between STAs and an AP to prevent or mitigate interference between wireless stations associated with the same access point that are in relatively close physical proximity. Accordingly, embodiments of the present invention substantially mitigate or prevent in-device and inter-device interference (e.g., AACI) by grouping wireless stations associated with an AP according to their estimated physical proximity with each other. The transmissions to/from STAs within a group can be coordinated so that a wireless transmission does not interfere with the wireless reception of another STA within the same group. In this way, desense is avoided and the wireless reception can be performed efficiently.

According to one disclosed embodiment, a method of transmitting data in a wireless network performed by a wireless access point (AP) is disclosed. The method includes determining that a first wireless station (STA) and a second STA are associated with the AP, creating an STA group by grouping the first STA and the second STA, and coordinating transmissions of the first STA and the second STA to avoid simultaneous transmission and reception of devices in the STA group.

According to some embodiments, the method includes receiving transmission information from the first STA.

According to some embodiments the transmission information includes a received signal strength indicator (RSSI).

According to some embodiments, the first STA transmits the transmission information responsive to determining that the RSSI is above a predetermined threshold.

According to some embodiments the transmission information includes an STA ID, a medium access control (MAC) address, band information, or an operating frequency.

According to some embodiments, the method includes measuring a first received signal strength indicator (RSSI) of a transmission received from the first STA, calculating first path loss information based on the first RSSI, measuring a second RSSI of a transmission received from the second STA, and calculating second path loss information based on the second RSSI, and the grouping the first STA and the second STA is performed according to the first and second path loss information.

According to some embodiments, the method includes calculating a first angle of arrival of the transmission received from the first STA and calculating a second angle of arrival of the transmission received from the second STA, and the grouping the first STA and the second STA further is performed according to the angles of arrival.

According to some embodiments, the method includes receiving a block acknowledgment (BA) from the first STA, and the creating an STA group is performed according to the BA.

According to some embodiments, the method includes determining that the first STA experienced a reception failure while the second STA was transmitting data, and the grouping the first STA and the second STA is performed responsive to the determining that the first STA experienced the reception failure while the second STA was transmitting data.

According to a different embodiment, a wireless access point (AP) is disclosed. The AP includes a plurality of wireless transceivers and a processor configured to determine that a first wireless station (STA) and a second STA are associated with the AP, group the first STA and the second STA to create an STA group, and coordinate transmissions of the first STA and the second STA to avoid simultaneous transmission and reception of devices in the STA group.

According to some embodiments, the processor is further configured to receive transmission information from the first STA.

According to some embodiments, the first STA and the second STAs are operating on bands that are close in frequency.

According to some embodiments, the transmission information includes a received signal strength indicator (RSSI).

According to some embodiments, the first STA transmits the transmission information responsive to determining that the RSSI is above a predetermined threshold.

According to some embodiments, the transmission information includes a medium access control (MAC) address, band information, or an operating frequency.

According to some embodiments, the processor is further configured to measure a first received signal strength indicator (RSSI) of a transmission received from the first STA, calculate first path loss information based on the first RSSI, measure a second RSSI of a transmission received from the second STA, and calculate second path loss information based on the second RSSI. The processor groups the first STA and the second STA to create an STA group according to the first and second path loss information.

According to some embodiments, the processor is further configured to calculate a first angle of arrival of the transmission received from the first STA and calculate a second angle of arrival of the transmission received from the second STA. The processor groups the first STA and the second STA to create the STA group according to the angles of arrival.

According to some embodiments, the first STA and the second STAs are operating on bands that are close in frequency.

According to some embodiments, the processor is further configured to determine that the first STA experienced a reception failure while the second STA was transmitting data, and the processor groups the first STA and the second STA to create the STA group responsive to determining that the first STA experienced the reception failure while the second STA was transmitting data.

According to another embodiment, a non-transitory computer-readable storage medium having embedded therein program instructions is disclosed. When executed by one or more processors of a device, the program instructions cause the device to execute a process for coordinating transmissions of wireless stations in a wireless station group. The method includes determining that a first wireless station (STA) and a second STA are associated with a wireless access point (AP), creating an STA group by grouping the first STA and the second STA, and coordinating transmissions of the first STA and the second STA to avoid simultaneous transmission and reception of devices in the STA group.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
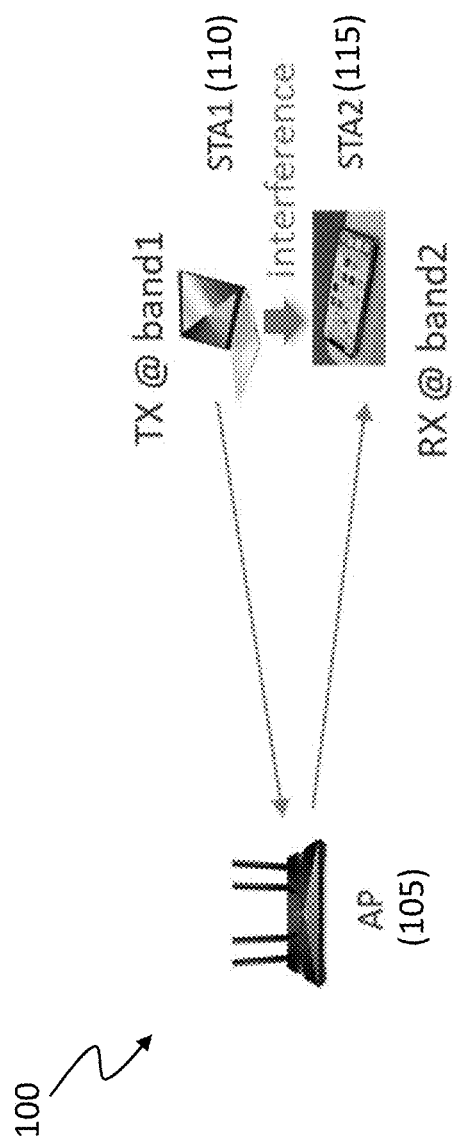
FIG. 1 is a diagram of an exemplary wireless network including a wireless access point associated with STAs that are relatively close to each other leading to interference.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 11) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Grouping Wireless Devices for Coordinated Operation

Embodiments of the present invention substantially mitigate or prevent in-device and inter-device signal interference (e.g., AACI) by advantageously grouping wireless stations associated with an AP according to their estimated physical proximity with each other. The STAs within a group can be coordinated so that a wireless transmission does not interfere with a contemporaneous wireless reception of another STA within the same group. In this way, the unwanted effects of desense are avoided and the wireless reception can be performed efficiently.

FIG. 1 is a diagram of an exemplary wireless network 100 including wireless access point 105 associated with STA1 (110) and STA2 (115). STA1 and STA2 transmit over different wireless bands that are close in frequency, and STA1 and STA2 are relatively close to each other geographically (e.g., within 5 meters). Accordingly, when one of the STAs transmits data wirelessly while the other STA is receiving data wirelessly, or begins transmitting data wirelessly while the other STA is already receiving data wirelessly, significant signal interference between the STAs (e.g., AACI) can cause signal degradation. Specifically, the STA that is receiving data will experience a degraded signal (desense) and the transmission will therefore be less efficient. The AACI depicted between band1 and band2 in the example of FIG. 1 is inter-device interference caused by distinct wireless devices.

Figure 2:
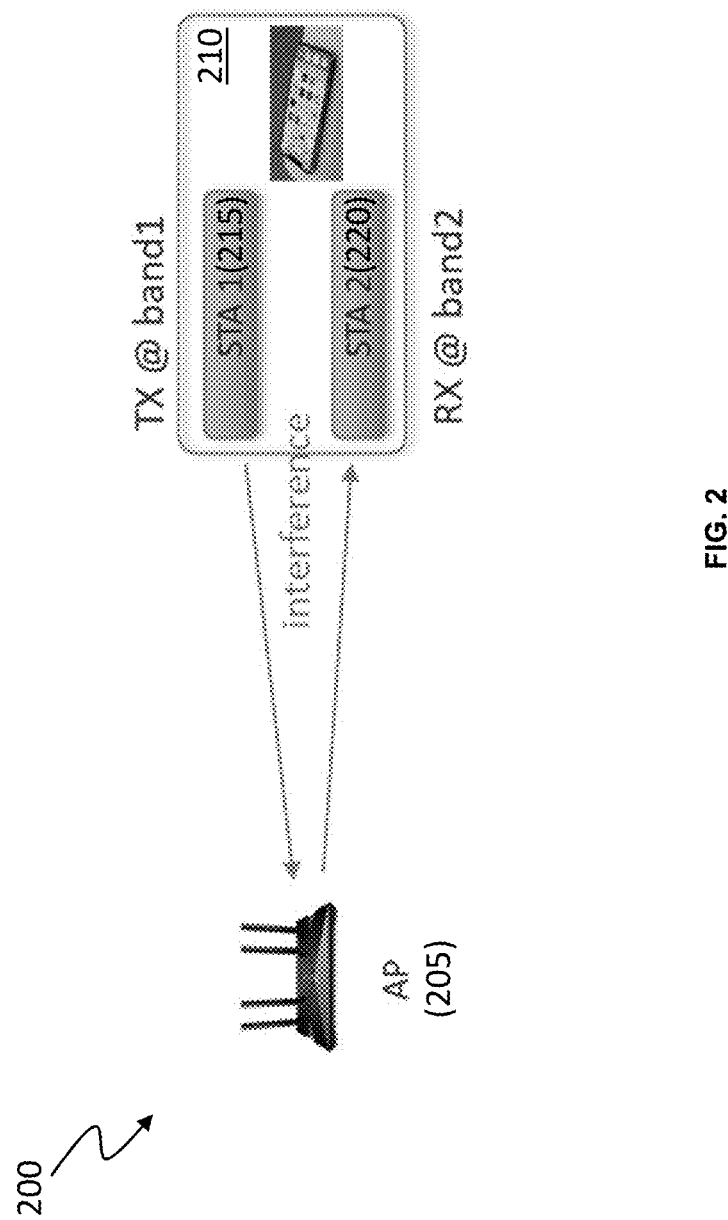
FIG. 2 is a diagram of an exemplary wireless network including a wireless device experiencing in-device AACI while simultaneously transmitting and receiving data.

FIG. 2 is a diagram of an exemplary wireless network 200 including a wireless device 210 experiencing in-device AACI while simultaneously transmitting and receiving data. Wireless device 210 may be any one of a number of different well-known components including a wireless smartphone, laptop, or tablet for example, and includes a first wireless station 215 and a second wireless station 220 capable of operation over different wireless bands.

STA 215 and a STA 220 can be configured to operate simultaneously over wireless bands that are close or similar in frequency. Accordingly, when one of the STAs transmits data wirelessly while the other STA is receiving data wirelessly, or begins transmitting data wirelessly while the other STA is already receiving data wirelessly, significant signal interference between the STAs (e.g., AACI) can cause signal degradation. Specifically, the STA that is receiving data will experience a degraded signal and the transmission will therefore be less efficient. The AACI depicted between band1 and band2 in the example of FIG. 2 is in-device interference caused by different wireless stations of the same wireless device (e.g., a dual or multi-band wireless device).

Figure 3:
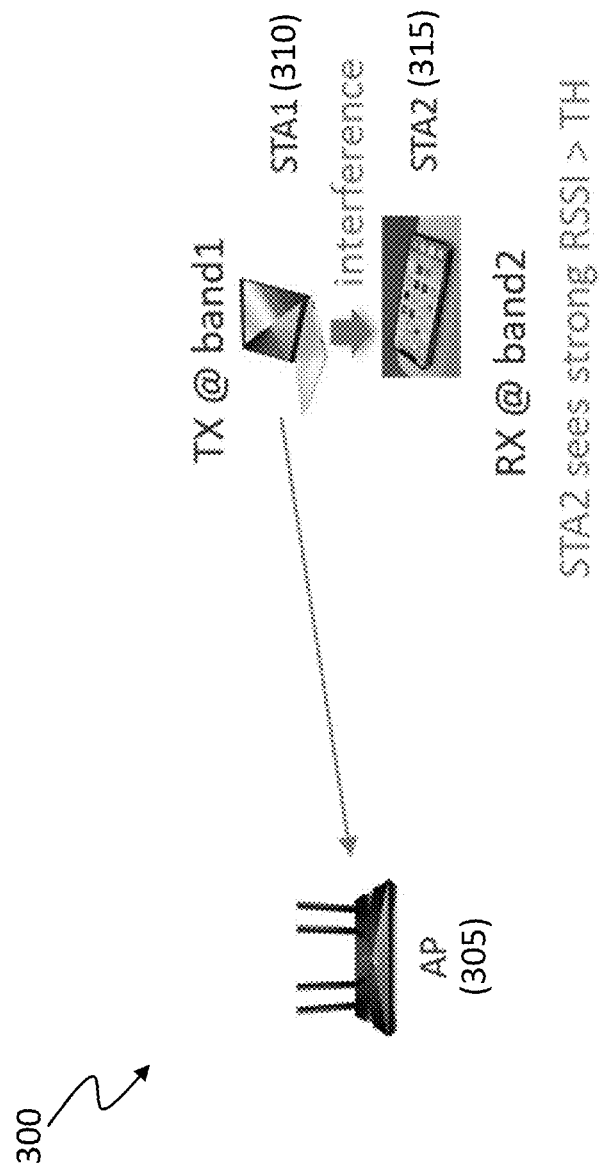
FIG. 3 is a diagram of an exemplary wireless network performing a first step for coordinating transmission between wireless devices grouped based on a received signal strength indicator (RSSI) threshold according to embodiments of the present invention.
Figure 4:
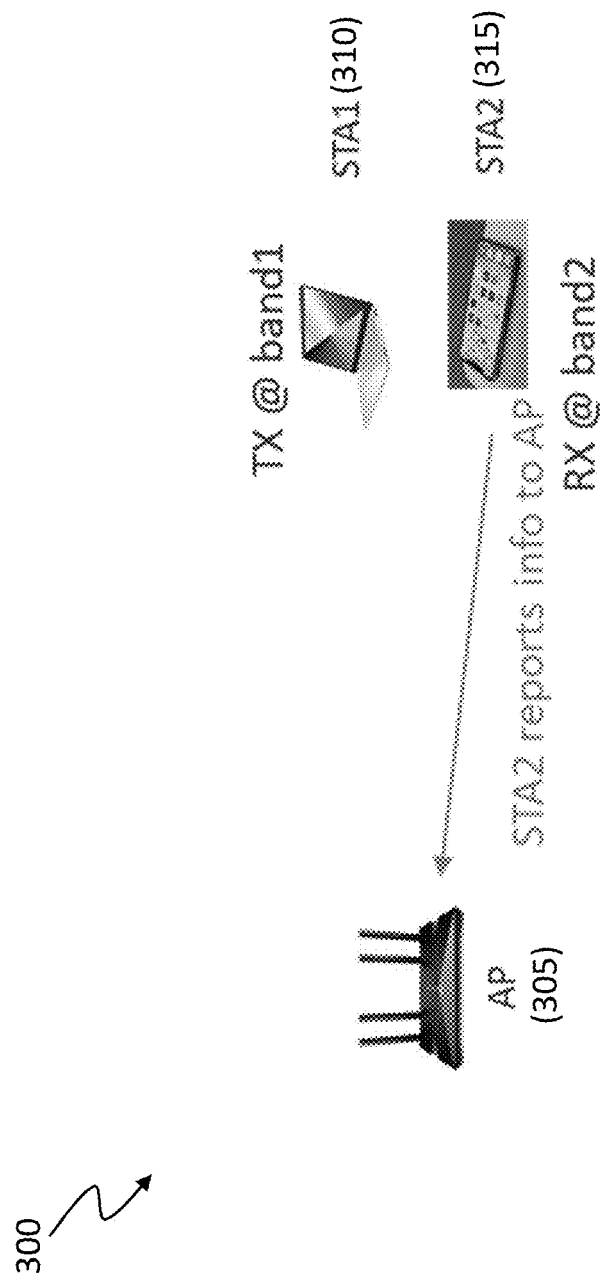
FIG. 4 is a diagram of an exemplary wireless network performing a second step for coordinating transmission between wireless devices grouped based on a received signal strength indicator (RSSI) threshold according to embodiments of the present invention.

FIGS. 3 and 4 are diagrams of an exemplary wireless network 300 for coordinating transmission between wireless devices grouped based on a received signal strength indicator (RSSI) threshold according to embodiments of the present invention. In the example of FIG. 3, AP 305 is associated with wireless devices STA1 (310) and STA2 (315). STA2 may experience desense when receiving data from wireless AP 305 if STA1 begins transmitting to AP 305. For example, SAT 2 may experience AACI that is magnified when STA1 and STA2 are in close physical proximity and/or are using bands that are close in frequency. Accordingly, to prevent interference between STA1 and STA2, the STAs associated with AP 305 can detect RSSI and report the detected RSSI to AP 305 for identifying potential interference between the STAs.

One example is now described. As depicted in FIG. 3, STA1 transmits data to AP 305 causing interference that is detected by STA2. STA2 determines if the received interference is from an STA associated with the same AP (e.g., AP 305) as STA2. If the STA is not associated with the same AP as STA2, the process ends. If STA2 determines that the STA is associated with AP 305, STA2 then determines if the received RSSI from the STA is larger than a predetermined RSSI threshold. As depicted in FIG. 4, if the RSSI received from STA 1 is larger than the RSSI threshold, STA2 reports information associated with STA1 ("transmission information") to AP 305. The information reported by STA2 may include the interference source (e.g., STA ID, MAC address, etc.), the band info (e.g., operating frequency), the received RSSI, etc. Because STA1 and STA2 are associated with AP 305 and the received RSSI is above the threshold, AP 305 advantageously groups STA1 and STA2 to coordinate wireless operations and advantageously prevent interference between the devices.

Figure 5:
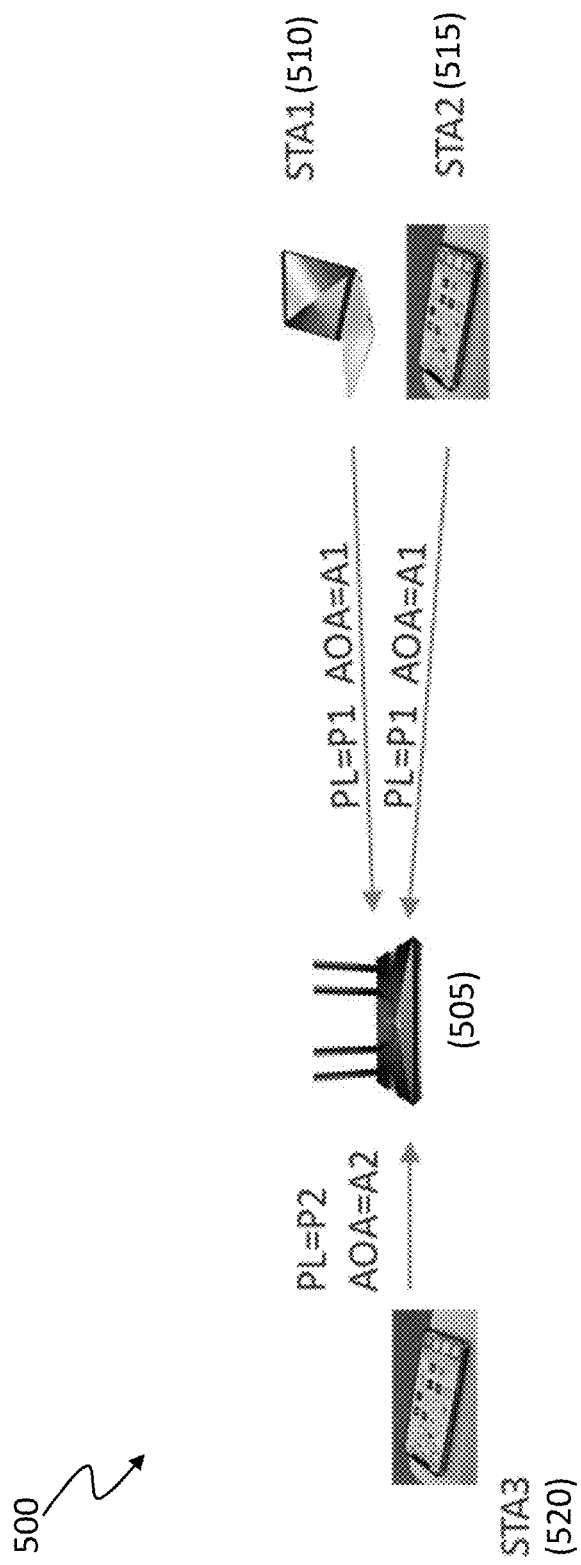
FIG. 5 depicts an exemplary wireless network for coordinating transmission between wireless devices grouped according to RSSI, pathloss, and/or angle of arrival, according to embodiments of the present invention.

FIG. 5 depicts an exemplary wireless network 500 for coordinating transmission between wireless devices grouped according to RSSI, pathloss (PL), and/or angle of arrival (AOA) according to embodiments of the present invention. In the example of FIG. 5, AP 505 groups associated STAs according to metrics measured at the AP-side. For example, AP 505 can measure RSSI when receiving data from STA1 (510), STA2 (515), and STA3 (520) and calculate path loss information according to the transmission power (TxPwr) of an STA indicated in a trigger-based UL packet. AP 505 can also calculate the angle of arrival between AP 505 and an STA and estimate the physical proximity of the devices relative to each other according to the PL and the AOA. The AOA can be determined according to channel state information (CSI) of the bands and the antenna pattern of AP 505, for example.

AP 505 can group the STAs for coordinating transmissions of the STAs to prevent or mitigate signal interference between the group of STAs based on the metrics measured by the AP. For example, if STA1 and STA2 are determined to be in close physical proximity (e.g., within 3 meters) according to the calculated PL and AOA, STA1 and STA2 can be grouped together by AP 505 to coordinate transmissions between the devices. In the example of FIG. 5, AP 505 calculates the PL and AOA associated with STA3 and does not group STA3 with STA1 and STA2 because the PL and AOA information for STA3 are substantially different.

Figure 6:
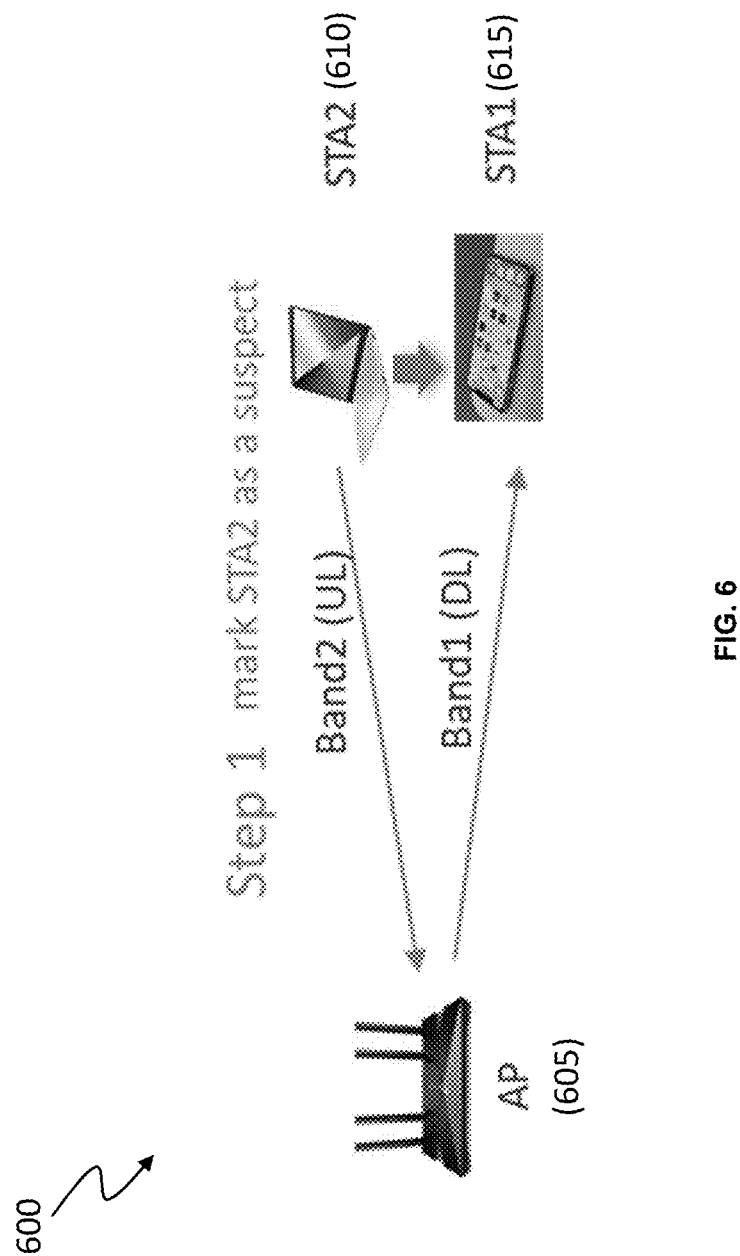
FIG. 6 depicts an exemplary wireless network for coordinating transmission between wireless devices operating on wireless bands that operate with overlapping transmissions in opposite directions that are close in frequency according to embodiments of the present invention.
Figure 7:
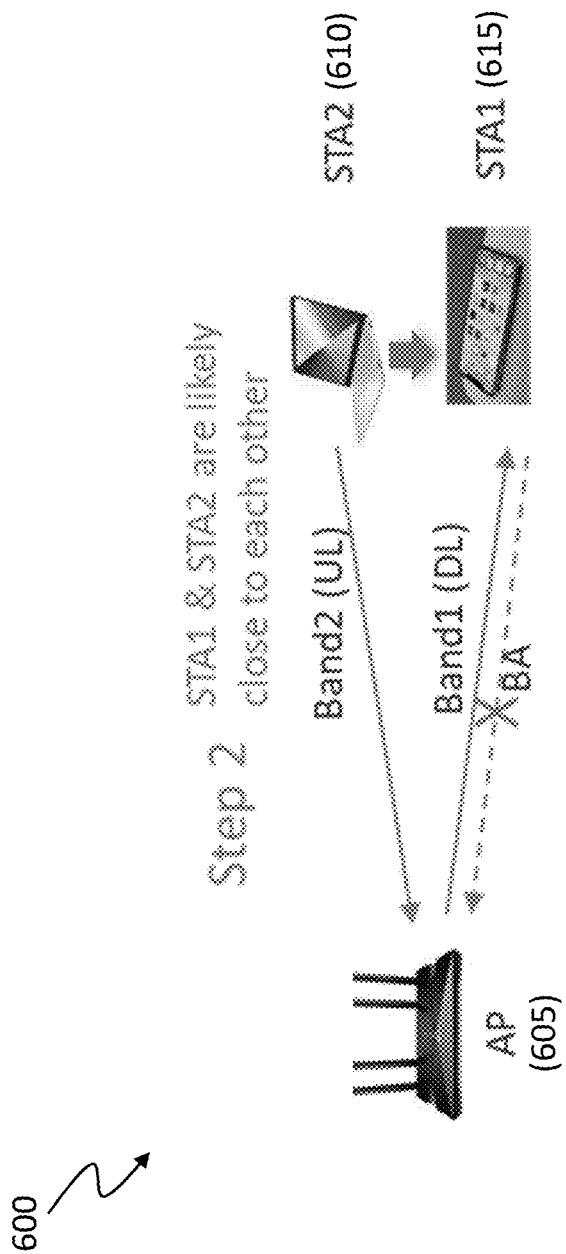
FIG. 7 depicts an exemplary wireless network for coordinating transmission between wireless devices grouped according to a receiving failure that coincide with the transmission of an associated STA according to embodiments of the present invention.
Figure 8:
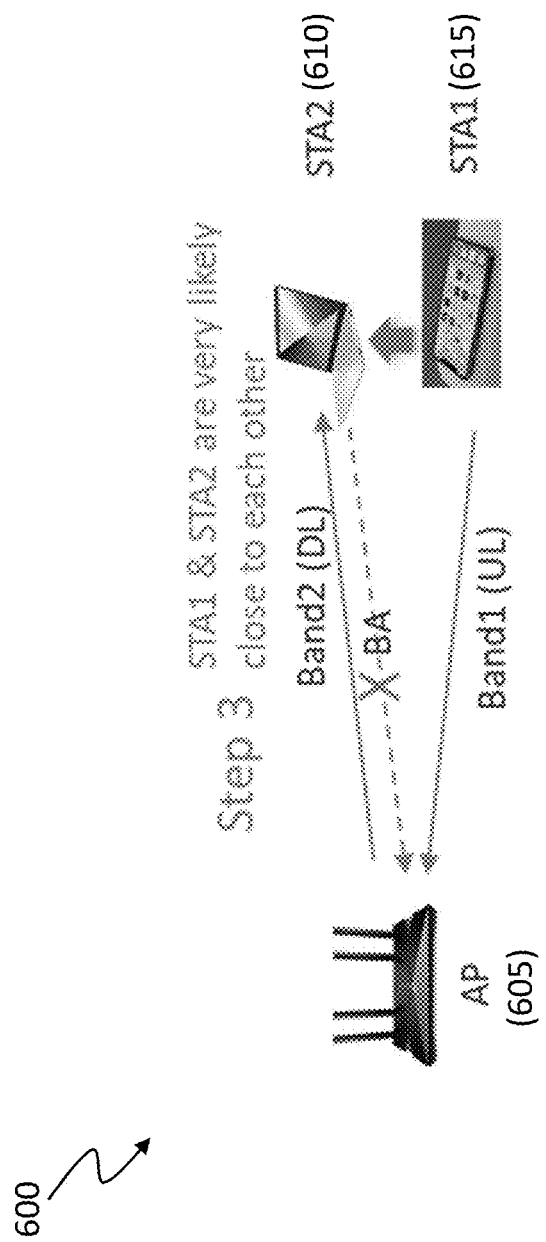
FIG. 8 depicts an exemplary wireless network for coordinating transmission between wireless devices experiencing to a receiving failure that coincides with the transmission of an associated STA according to embodiments of the present invention.

FIGS. 6-8 depict an exemplary wireless network 600 for coordinating transmissions between wireless devices grouped according to receiving failures that coincide with the transmission of an associated STA according to embodiments of the present invention. AP 605 can listen over nearby bands (e.g., band 2) while transmitting data to a wireless station over band 1 to determine if the band is busy. As depicted in FIG. 6, STA1 (615) is receiving a transmission from AP 605 over band 1 while STA2 (610) is transmitting UL data to AP 605 over band 2. Accordingly, AP 605 identifies STA2 a potential source of interference to STA1 if transmissions of the devices transmitted in different directions overlap.

Continuing in FIG. 7, if AP 605 does not receive an acknowledgement from STA1 (e.g., a block ack (BA)), AP 605 determines that STA1 and STA2 are likely relatively close to each other (e.g., within 3 meters). AP 605 can group STA1 and STA2 to coordinate transmissions of the devices for preventing or mitigating interference between the devices (e.g., AACI) after any number of receiving errors are detected.

As depicted in FIG. 8, AP 605 detects overlapping transmissions. When AP 605 subsequently fails to receive a BA from STA2 while STA1 is transmitting, it is considered further evidence that STA1 and STA2 are in close physical proximity. In this case AP 605 will typically group STA1 and STA2 for coordinated transmission.

AP 605 may receive a BA from STA1 or STA2 indicating that some of the data transmitted by STA1 or STA2 was successfully received. In the case of a partial transmission failure, AP 605 can determine that STA1 and STA2 are in close physical proximity according to the BA and group the STAs for coordinated transmission.

Figure 9:
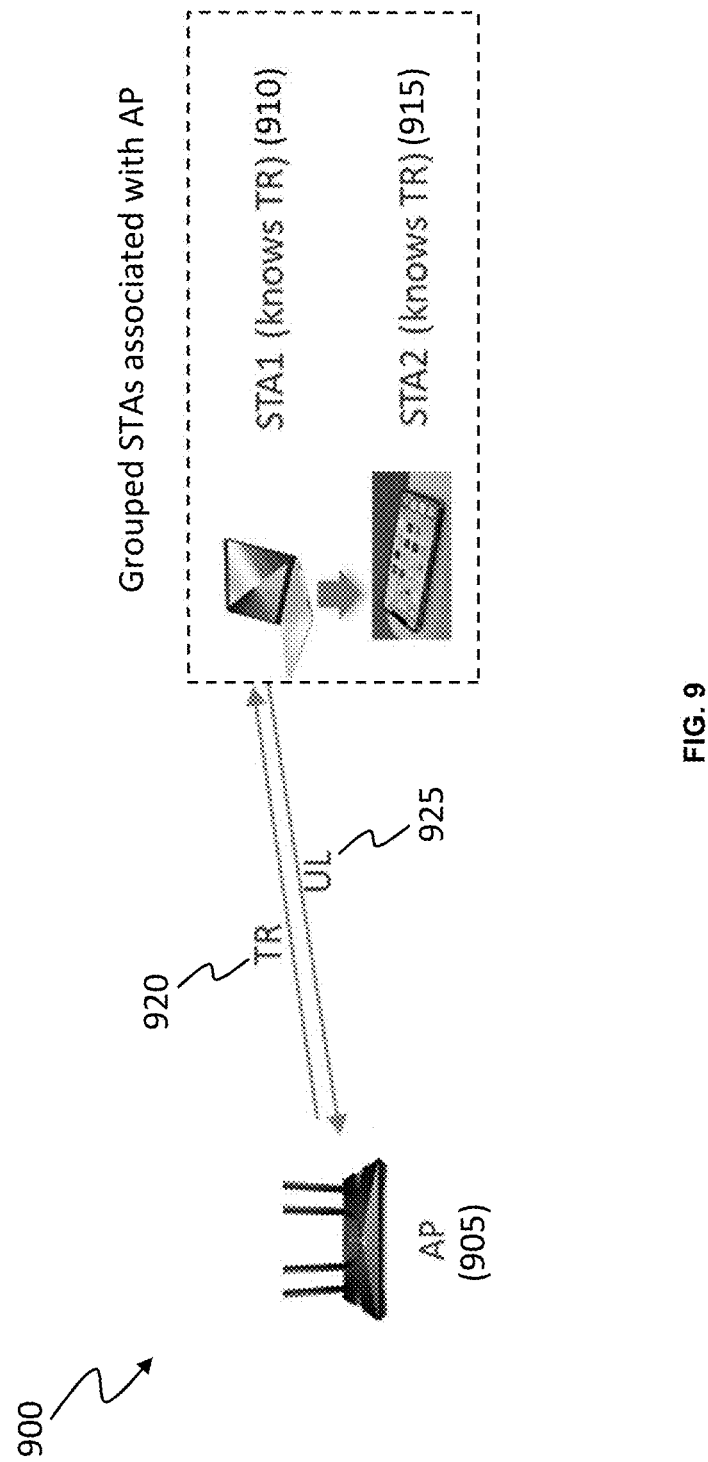
FIG. 9 depicts an exemplary wireless network including an AP that solicits UL transmissions using a trigger frame to avoid simultaneous DL and UL transmission within the same group according to embodiments of the present invention.

Coordinated Wireless Transmission of Wireless Devices to Prevent Interference Within a Group After an AP defines groups of associated wireless stations according to estimated physical proximity, the AP can coordinate subsequent transmissions to prevent STAs in the same group from transmitting and receiving at the same time. For example, as depicted in FIG. 9, AP 905 of exemplary wireless network 900 can use trigger frame (TR) 920 to solicit UL transmission 925 from the STAs to advantageously avoid simultaneous downlink (DL) and UL transmission within the same group according to embodiments of the present invention. AP 905 does not schedule a packet for transmission to STA2 that would be transmitted while STA1 is transmitting UL data in response to trigger frame 920. In this way, signal interference between STA1 and STA2 is advantageously avoided.

Figure 10:
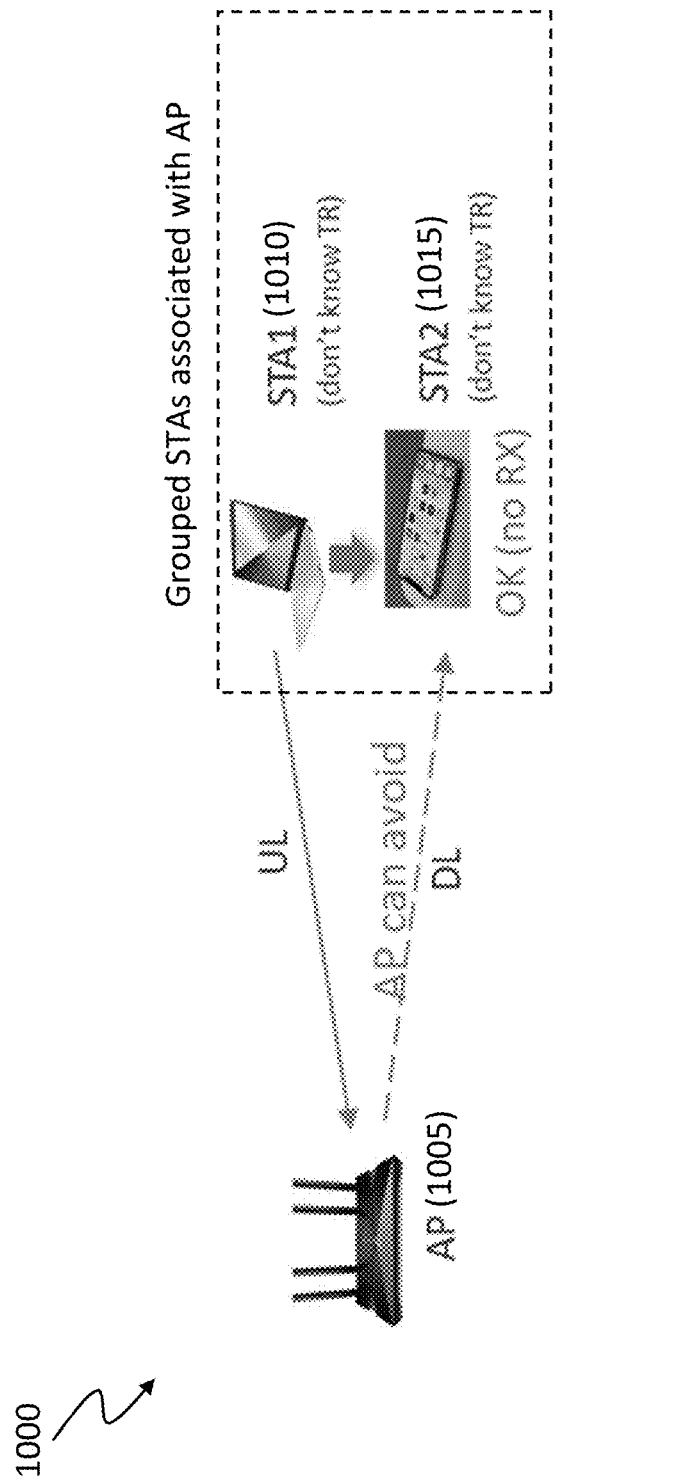
FIG. 10 depicts an exemplary wireless network including STAs in close proximity to each other that do not understand trigger frames (e.g., legacy devices) according to embodiments of the present invention.

FIG. 10 depicts an exemplary wireless network 1000 including STAs in close proximity to each other that do not understand trigger frames (e.g., legacy devices) according to embodiments of the present invention. After AP 1005 groups associated STAs ("STA groups") according to information collected from the STAs (e.g., RSSI), or according to information calculated by the AP (e.g., RSSI, PL, AOA), AP 1005 coordinates transmissions between the STAs and the AP to prevent interference between the STAs. For example, as depicted in FIG. 10, AP 1005 can avoid scheduling transmissions to STA2 (1015) while receiving UL data from STA1 to advantageously prevent interference between the STAs.

Figure 11:
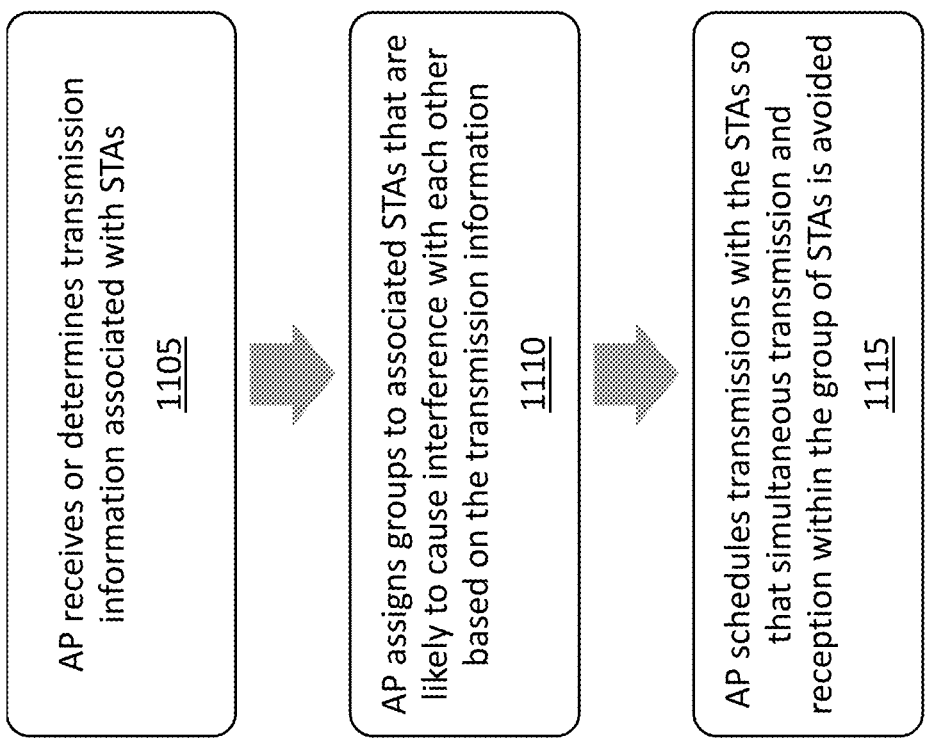
FIG. 11 is a flow chart of an exemplary sequence of computer implemented steps for automatically scheduling transmissions between a wireless access point and its associated wireless devices (STAs) to prevent interference between the wireless devices caused by simultaneous transmission and reception thereof according to embodiments of the present invention.

FIG. 11 is a flow chart of an exemplary sequence of computer implemented steps for automatically scheduling transmissions between a wireless access point and its associated wireless devices (STAs) to reduce and/or prevent signal interference between the wireless devices during simultaneous transmission and reception thereof.

At step 1105, the AP receives or determines transmission information associated with the STAs directly or indirectly. The direct transmission information may include the interference source (e.g., STA ID, MAC address, etc.), the band info (e.g., operating frequency), and/or the received RSSI. The direct transmission information can also be received from an STA associated with the AP and can include information pertaining to another associated STA that is suspected of being in close physical proximity to the reporting STA (e.g., based on RSSI). Indirect transmission information may include the receiving quality (e.g. information indicated in or derived from BA) and traffic patterns (e.g. indication of overlapping transmission and reception). Step 1105 can also include receiving an acknowledgment (e.g., a BA or bitmap) to determine if devices are in close physical proximity according to the successful/unsuccessful transmissions indicated in the acknowledgment.

At step 1110, the AP assigns groups to associated STAs that are likely to cause signal interference with each other based on the transmission information. For example, associated STAs can be grouped according to their estimated physical proximity with other STAs in the group. According to some embodiments, STAs that are estimated to be within approximately 3 meters are grouped together. Step 1110 can include grouping STAs according to direct information received from the STAs or metrics calculated by the AP, such as PL, AOA, and/or RSSI as well as indirect information, for example.

At step 1115, the AP schedules transmissions with the STAs so that simultaneous transmission and reception over bands close in frequency within the group of STAs is avoided. Step 1115 includes transmitting trigger frames soliciting uplink transmission from an STA, according to some embodiments. Accordingly, signal interference between STAs within the group is avoided and transmissions between the AP and the STAs are performed efficiently and without reception errors due to desense.

Exemplary Computer Controlled System

Figure 12:
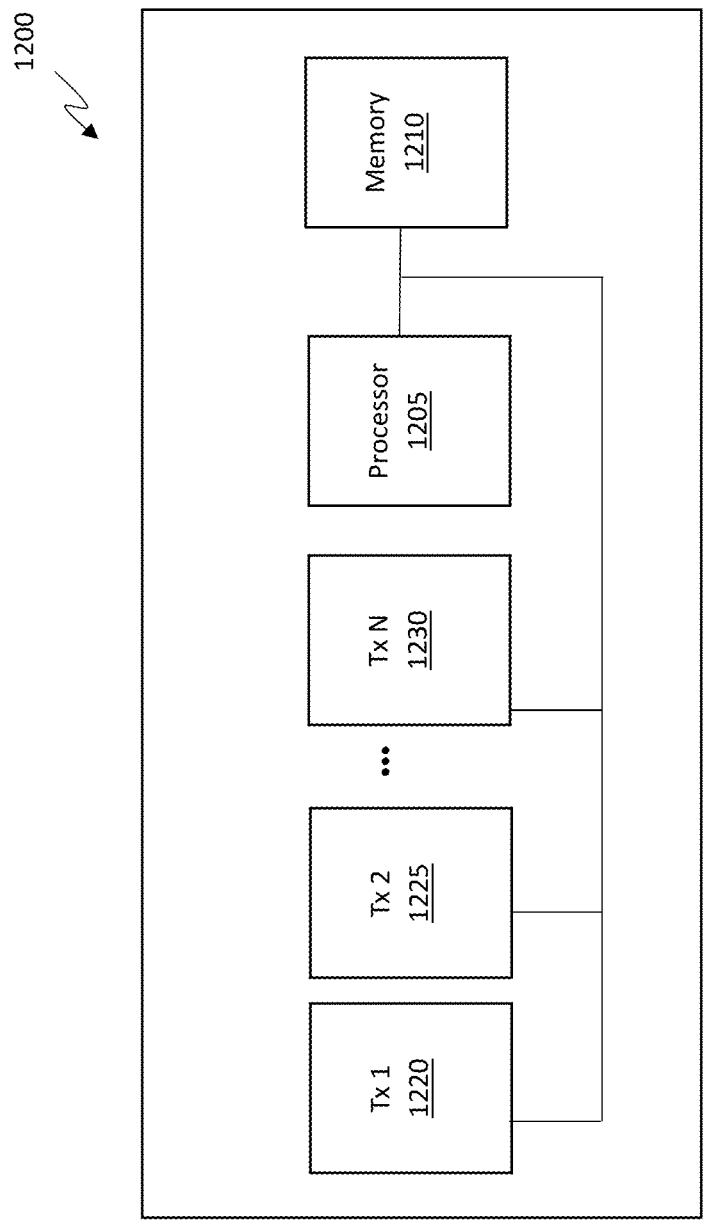
FIG. 12 is a block diagram depicting an exemplary computer system platform upon which embodiments of the present invention may be implemented.

FIG. 12 depicts an exemplary wireless device 1200 upon which embodiments of the present invention can be implemented. Embodiments of the present invention automatically transmit and/or schedule to transmit data between a wireless access point and a group of associated wireless devices (STAs) in a manner that advantageously prevents interference between the devices caused by simultaneous transmission and reception over bands close in frequency (AACI). The following discussion describes one such exemplary electronic system or computer system that can be used as a platform for implementing embodiments of the present invention. The exemplary computer system 1200 can be a wireless access point or a wireless station, for example.

The wireless device 1200 includes a processor 1205 for running software applications and optionally an operating system. Memory 1210 can include read-only memory and/or random access memory, for example, to store applications and data (e.g., tables of index values) for use by the processor 1205 and data received or transmitted by transceivers 1220, 1225, and 1230 over different wireless links. The wireless device 1200 can include fewer or more transceivers according to some embodiments. The transceivers 1220, 1225, 1230 communicate with other electronic devices over a wireless network (e.g., WLAN) and typically operates according to IEEE standards (e.g., IEEE 802.11ax, IEEE 802.11ay, IEEE 802.11be, etc.).

Embodiments of the present invention are thus described. While the present invention has been described in particular embodiments, it should be appreciated that the present invention should not be construed as limited by such embodiments, but rather construed according to the following claims.

What is claimed is:

1. A method of transmitting data in a wireless network performed by a wireless access point (AP), the method comprising:
   determining that a first wireless station (STA) and a second STA are associated with the AP;
   determining that wireless communications of the first STA and the second STA cause interference with each other due to physical proximity;
   measuring a first received signal strength indicator (RSSI) of a transmission received from the first STA;
   calculating first path loss information based on the first RSSI;
   measuring a second RSSI of a transmission received from the second STA;
   calculating second path loss information based on the second RSSI;
   calculating a first angle of arrival of the transmission received from the first STA;
   calculating a second angle of arrival of the transmission received from the second STA;
   creating an STA group by grouping the first STA and the second STA responsive to the determining that the wireless communications of the first STA and the second STA cause interference with each other due to physical proximity;
   and coordinating the wireless communications of the first STA and the second STA to prevent interference, caused by simultaneous transmission and reception of devices in the STA group.

2. The method of claim 1, further comprising receiving transmission information from the first STA.

3. The method of claim 2, wherein the transmission information comprises a received signal strength indicator (RSSI).

4. The method of claim 3, wherein the first STA transmits the transmission information responsive to determining that the RSSI is above a predetermined threshold.

5. The method of claim 2, wherein the transmission information comprises: an STA ID; a medium access control (MAC) address; band information; or an operating frequency.

6. The method of claim 1, further comprising receiving a block acknowledgment (BA) from the first STA, wherein the creating an STA group is performed according to the BA.

7. The method of claim 6, further comprising determining that the first STA experienced a reception failure while the second STA was transmitting data, and wherein the grouping the first STA and the second STA is performed responsive to the determining that the first STA experienced the reception failure while the second STA was transmitting data.

8. A wireless access point (AP), comprising:
   a plurality of wireless transceivers; and
   a processor configured to:
   determine that a first wireless station (STA) and a second STA are associated with the AP;
   determine that wireless communications of the first STA and the second STA cause interference with each other due to physical proximity;
   measure a first received signal strength indicator (RSSI) of a transmission received from the first STA;
   calculate first path loss information based on the first RSSI;
   measure a second RSSI of a transmission received from the second STA;
   calculate second path loss information based on the second RSSI;
   calculate a first angle of arrival of the transmission received from the first STA;
   calculate a second angle of arrival of the transmission received from the second STA;
   group the first STA and the second STA to create an STA group responsive to the determining that wireless communications of the first STA and the second STA are likely to cause interference with each other; and
   coordinate the wireless communications of the first STA and the second STA to prevent interference, caused by simultaneous transmission and reception of devices in the STA group.

9. The wireless access point of claim 8, wherein the processor is further configured to receive transmission information from the first STA.

10. The wireless access point of claim 9, wherein the first STA and the second STAs are within 5 meters of each other.

11. The wireless access point of claim 9, wherein the transmission information comprises a received signal strength indicator (RSSI).

12. The wireless access point of claim 11, wherein the first STA transmits the transmission information responsive to determining that the RSSI is above a predetermined threshold.

13. The wireless access point of claim 9, wherein the transmission information comprises: a medium access control (MAC) address; band information; or an operating frequency.

14. The wireless access point of claim 8, wherein the first STA and the second STAs are within 5 meters of each other.

15. The wireless access point of claim 14, wherein the processor is further configured to determine that the first STA experienced a reception failure while the second STA was transmitting data, wherein the processor groups the first STA and the second STA to create the STA group responsive to determining that the first STA experienced the reception failure while the second STA was transmitting data.

16. A non-transitory computer-readable storage medium having embedded therein program instructions, which when executed by one or more processors of a device, causes the device to execute a process for coordinating transmissions of wireless stations in a wireless station group, the method comprising:

determining that a first wireless station (STA) and a second STA are associated with a wireless access point (AP);
determining that wireless communications of the first STA and the second STA cause interference with each other due to physical proximity;
measuring a first received signal strength indicator (RSSI) of a transmission received from the first STA;
calculating first path loss information based on the first RSSI;
measuring a second RSSI of a transmission received from the second STA;
calculating second path loss information based on the second RSSI;
calculating a first angle of arrival of the transmission received from the first STA;
calculating a second angle of arrival of the transmission received from the second STA;
creating an STA group by grouping the first STA and the second STA responsive to the determining that the wireless communications of the first STA and the second STA cause interference with each other due to physical proximity; and
coordinating the wireless communications of the first STA and the second STA to prevent interference, caused by simultaneous transmission and reception of devices in the STA group.

* * * * *